(12) United States Patent
Mogul et al.

(10) Patent No.: US 10,728,171 B2
(45) Date of Patent: Jul. 28, 2020

(54) GOVERNING BARE METAL GUESTS

(71) Applicant: Hewlett-Packard Development Company, L.P., Houston, TX (US)

(72) Inventors: Jeffrey Clifford Mogul, Palo Alto, CA (US); Jose Renato G. Santos, Palo Alto, CA (US); Yoshio Turner, Palo Alto, CA (US); Kevin T. Lim, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 175 days.

(21) Appl. No.: 14/787,529

(22) PCT Filed: Apr. 30, 2013

(86) PCT No.: PCT/US2013/038717
§ 371 (c)(1),
(2) Date: Oct. 28, 2015

(87) PCT Pub. No.: WO2014/178826
PCT Pub. Date: Nov. 6, 2014

(65) Prior Publication Data
US 2016/0080287 A1    Mar. 17, 2016

(51) Int. Cl.
*G06F 15/173*    (2006.01)
*H04L 12/911*    (2013.01)
(Continued)

(52) U.S. Cl.
CPC ........ *H04L 47/829* (2013.01); *G06F 9/44505* (2013.01); *G06F 9/45541* (2013.01); *G06F 21/53* (2013.01); *H04L 67/10* (2013.01)

(58) Field of Classification Search
CPC ....... H04L 47/829; H04L 67/10; G06F 21/53; G06F 9/44505; G06F 9/45541
(Continued)

(56) References Cited

U.S. PATENT DOCUMENTS 6,347,362 B1 * 2/2002 Schoinas ............. G06F 11/3006
711/147
7,660,937 B2 * 2/2010 Frantz ................... G06F 13/107
710/311
(Continued)

FOREIGN PATENT DOCUMENTS

| CN | 102713849 A | 10/2012 |
|---|---|---|
| CN | 103069391 A | 4/2013 |

OTHER PUBLICATIONS

Abhijit Aswath and Srinivas Thodati, Enhancing Scalability Through Network Interface Card Partitioning, White Paper, Apr. 2011, pp. 1-6, Broadcom.
(Continued)

*Primary Examiner* — Umar Cheema
*Assistant Examiner* — Anh Nguyen
(74) *Attorney, Agent, or Firm* — Hewlett Packard Enterprise Patent Department

(57) ABSTRACT

Disclosed herein are a system, non-transitory computer readable medium, and method for governing communications of a bare metal guest in a cloud network. A network interface handles packets of data in accordance with commands by a control agent.

20 Claims, 4 Drawing Sheets

(51) Int. Cl.
*G06F 9/445* (2018.01)
*G06F 21/53* (2013.01)
*G06F 9/455* (2018.01)
*H04L 29/08* (2006.01)

(58) Field of Classification Search
USPC ........................................................ 709/225
See application file for complete search history.

(56) References Cited

U.S. PATENT DOCUMENTS

| | | | |
|---|---|---|---|
| 7,996,525 B2 | 8/2011 | Stienhans et al. | |
| 9,015,350 B2* | 4/2015 | Pettey | H04L 29/12009 709/253 |
| 9,690,353 B2* | 6/2017 | Moran | G06F 1/3243 |
| 2005/0013313 A1* | 1/2005 | Liao | H04L 12/4633 370/412 |
| 2006/0106919 A1* | 5/2006 | Watkinson | H04L 41/00 709/220 |
| 2010/0027552 A1 | 2/2010 | Hill | |
| 2010/0070677 A1 | 3/2010 | Thakkar | |
| 2011/0185064 A1 | 7/2011 | Head et al. | |
| 2011/0258621 A1 | 10/2011 | Kern | |
| 2012/0016970 A1 | 1/2012 | Shah et al. | |
| 2012/0047357 A1 | 2/2012 | Bealkowski | |
| 2012/0233378 A1* | 9/2012 | Elteto | G06F 9/45558 711/6 |
| 2012/0254896 A1 | 10/2012 | Aloni et al. | |
| 2012/0311577 A1 | 12/2012 | Lee et al. | |
| 2013/0058346 A1 | 3/2013 | Sridharan et al. | |
| 2013/0282953 A1* | 10/2013 | Orme | G06F 12/0238 711/102 |
| 2014/0068703 A1* | 3/2014 | Balus | H04L 41/0893 726/1 |

OTHER PUBLICATIONS

International Search Report and Written Opinion, International Application No. PCT/US2013/038717, dated Feb. 3, 2014, pp. 1-8.
Ivan Pepelnjak, "Hypervisors Use Promiscuous NIC Mode—Does it Matter?," inSpace, Jul. 6, 2011, pp. 1-3.
European Patent Office, Extended European Search Report for Appl. No. 13883473.4 dated Nov. 10, 2016 (6 pages).
Szefer et al., "Eliminating the Hypervisor Attack Surface for a More Secure Cloud", Proceedings of the 18th ACM conference on Computer and communications security, 2011, pp. 401-412.
Steve Muir: "An Operating System Architecture for Network Processors", , Oct. 28, 2005 (Oct. 28, 2005).
Payne C et al: "Architecture and applications for a distributed embedded firewall", Proceedings / 17th Annual Computer Security Applications Conference [ACSAC] : Dec. 10-14, 2001, New Orleans, Louisiana, IEEE, Piscataway, NJ, USA, Dec. 10, 2001 (Dec. 10, 2001), pp. 329-336.
Mogul et al., "The NIC Is the Hypervisor: Bare-Metal Guests in IaaS Clouds", HotOS'13 Proceedings of the 14th USENIX conference on Hot Topics in Operating Systems, 2013, 6 pages.
International Preliminary Report on Patentability received for PCT Patent Application No. PCT/US2013/038717, dated Nov. 12, 2015, 7 pages.

\* cited by examiner

GOVERNING BARE METAL GUESTS

BACKGROUND

A hypervisor may be used to manage virtual machines executing in a physical computer. One responsibility of a hypervisor is to prevent each virtual machine from interfering with resources allocated to another. Furthermore, since attackers can potentially use a virtual machine to gain access to a cloud network, cloud service providers may use hypervisors to isolate virtual machines from cloud network resources.

DETAILED DESCRIPTION

As noted above, a hypervisor may be used to isolate virtual machines from cloud resources. However, not all entities elect to utilize hypervisors and virtual machines. Instead, some entities may prefer a bare metal guest ("BMG") configuration. In one example, a BMG configuration may comprise an operating system executing directly on an underlying, unshared server without an intervening hypervisor. While hypervisors have many advantages, they may hinder the performance of I/O intensive systems. As such, a BMG configuration may be a viable option for those who require maximum performance. Other reasons for not using a hypervisor may be increased costs incurred due to licensing policies of widely-used enterprise applications, or lack of hypervisor compatibility with applications used by some providers of infrastructure as a service ("IaaS").

Unfortunately, resources on the cloud network may be vulnerable to the unrestrained behavior of an un-trusted BMG. Such behavior may be unintentional or intentional in nature. As noted above, a BMG configuration executes an operating system without a hypervisor; and, without a hypervisor, the resources of a network may be infiltrated via the BMG computer. In view of the foregoing, disclosed herein are a system, computer-readable medium, and method for governing communications of a bare metal guest in a cloud network. In one example, a network interface may handle packets of data in accordance with commands by a control agent. In another example, the control agent may govern communication between the computer and resources of the cloud network. Thus, the techniques disclosed herein allow users to exploit the performance advantages of BMGs while maintaining the security advantages of a hypervisor. The aspects, features and other advantages of the present disclosure will be appreciated when considered with reference to the following description of examples and accompanying figures. The following description does not limit the application; rather, the scope of the disclosure is defined by the appended claims and equivalents.

Figure 1:
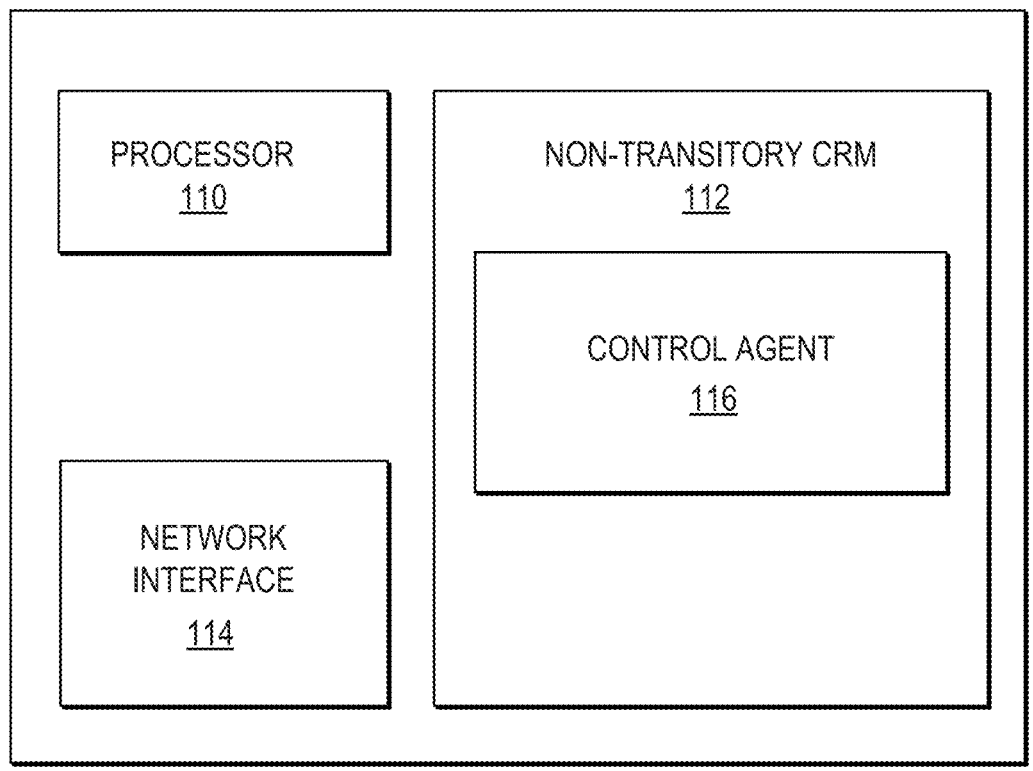
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface 114 to communicate with other devices over a network. As will be discussed in further detail below, network interface 114 may be a network interface controller ("NIC"). The computer apparatus 100 may also contain a processor 110, which may be any number of well known processors, such as processors from Intel® Corporation. In another example, processor 110 may be an application specific integrated circuit ("ASIC"). In yet a further example, network interface 114 and processor 110 may be combined into one integrated circuit chip. Non-transitory computer readable medium ("CRM") 112 may store instructions that may be retrieved and executed by processor 110. As will also be discussed in more detail below, the instructions may include a control agent 116.

Non-transitory CRM 112 may be used by or in connection with any instruction execution system that can fetch or obtain the logic from non-transitory CRM 112 and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Control agent 116 may be a module to govern communication between the computer and resources of the cloud network. Network interface 114 may be a NIC to route packets to and from the computer in accordance with commands from control agent 116. The commands may instruct at least one module in network interface 114. In another example, network interface 114 may be a network interface card, network adapter, LAN adapter or any other network controller that implements the electronic circuitry required to communicate with a network via, for example, a standard such as Ethernet, Wi-Fi or Token Ring.

Figure 2:
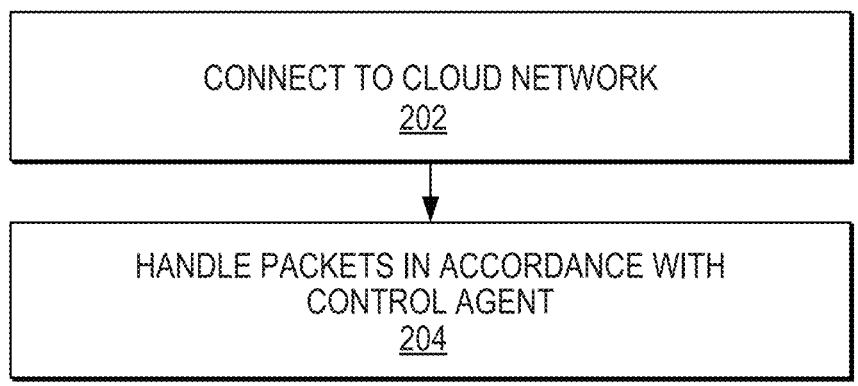
FIG. 2 is a flow diagram of an example method in accordance with aspects of the present disclosure.
Figure 3:
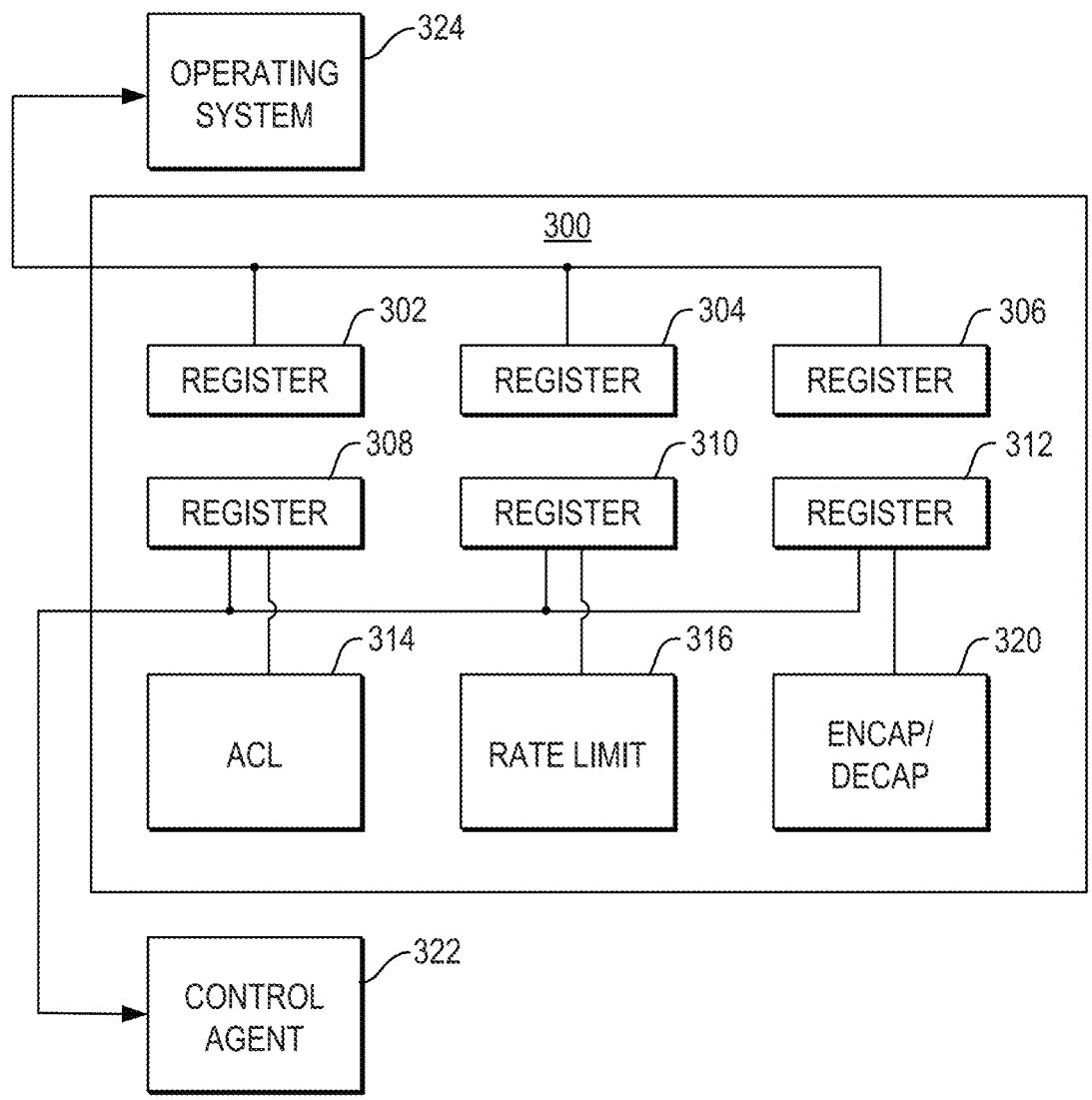
FIG. 3 is an example network interface in accordance with aspects of the present disclosure.
Figure 4:
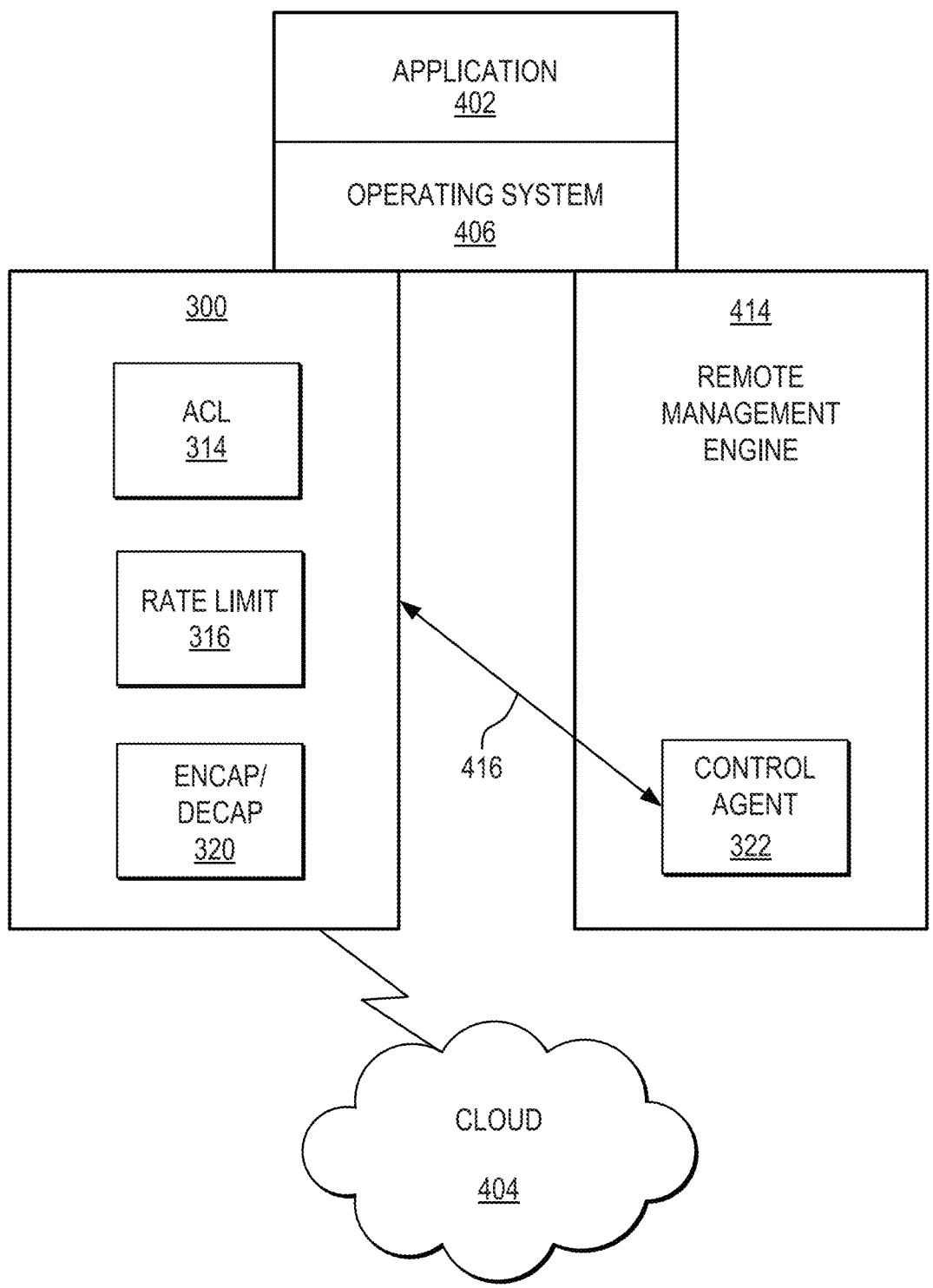
FIG. 4 is a further example system in accordance with aspects of the present disclosure.

Examples of the system, method, and non-transitory computer-readable medium are shown in FIGS. 2-4. In particular, FIG. 2 illustrates a flow diagram of an example method 200 for governing communications between a BMG and a network. FIGS. 3-4 each show an example in accordance with the techniques disclosed herein. The actions shown in FIGS. 3-4 will be discussed below with regard to the flow diagram of FIG. 2.

As shown in block 202 of FIG. 2, a computer may be communicatively connected to a cloud network. As noted above, the connection may be made using a network interface. Referring now to FIG. 3, one example network interface 300 is shown. In this example, network interface 300 is a NIC with registers 302, 304, 306, 308, 310, and 312. Furthermore, the example of FIG. 3 shows a first group of network interface registers (i.e., registers 308, 310, and 312) allocated to control agent 322, and a second group of the network interface registers (e.g., registers 302, 304, and 306) allocated to operating system 324. Operating system 324 may execute directly on an unshared computer in accordance with a BMG configuration.

Referring back to FIG. 2, packets may be handled in accordance with commands by the control agent, as shown in block 204. Referring back to FIG. 3, control agent 322 may utilize its allocated registers to govern communication between the BMG computer executing operating system 324 and resources of the cloud network. The registers allocated to operating system 324 may be used as standard NIC registers. That is, these registers may be used for initialization, packet transmission/reception, and remote DMA operations. In another example, control agent 322 may intervene and access the registers allocated to operating system 324 in certain situations. For example, control agent 322 may access these registers when a BMG is migrated from one server to another. In this instance, control agent 322 may access the registers allocated to operating system 324 to transfer the MAC address of operating system 324 from the originating server's NIC to the new server's NIC.

In another example, control agent 322 may instruct at least one module in network interface 300. Control agent 322 may use its associated registers (e.g., register 308, register 310, and register 312) in conjunction with modules of network interface 300 to govern communication between operating system 324 and resources of a cloud network. In the example of FIG. 3, control agent 322 may use register 308 in conjunction with access control list ("ACL") module 314 to associate rules with port numbers or IP addresses that are available to operating system 324. Control agent 322 may use the associated rules to control the source and destination of inbound and outbound traffic. Control agent 322 may use register 310 to access and control rate limit module 316. This allows control agent 322 to control the rate at which data packets are sent or received to and from network interface 300. In one example, control agent 322 may permit traffic that is less than or equal to the specified rate and prevent or delay traffic that exceeds the specified rate. Furthermore, control agent 322 may use register 312 in conjunction with encapsulation-decapsulation module 320 to append and pre-pend header or trailer records to incoming or outgoing packets. These header or trailer records may be used to exploit security features of a particular protocol, such as TCP/IP protocol.

Referring now to FIG. 4, one example implementation of a system for governing bare metal guests is shown. Application layer 402 and operating system layer 406 may reside within a physical computer apparatus configured as a BMG. As noted above, network interface 300 may comprise an ACL module 314, rate limit module 316, and an encapsulation-decapsulation module 320. Network interface 300 may establish a connection between operating system layer 406 and cloud network 404. FIG. 4 also shows a remote management engine 414. Remote management engine ("RME") 414 may execute on a remote computer and may be used to manage and support a physical computer on the cloud network. One example of an RME is the integrated lights out ("iLO") product produced by Hewlett Packard. RME 414 may simplify setup of a node on the cloud and monitor the power and thermal control thereof. RME 414 may remotely manage a physical computer on the cloud configured as a BMG. In the example shown in FIG. 4, control agent 322 is a module of RME 414. However, in another example, control agent 322 may be a module of network interface 300. If control agent 322 is a module of an RME as shown in FIG. 4, a secure channel 416 may be formed between control agent 322 and the registers of the network interface that are allocated to the control agent. In one example, RME 414 may comprise a network controller side band interface ("NC-SI"). Control agent 322 may use the NC-SI to communicate with network interface 300.

Advantageously, the foregoing system, method, and non-transitory computer readable medium allow BMG computers on a cloud network to communicate securely without a hypervisor. In this regard, cloud service providers hosting BMG guests can be rest assured that their network is secure from attackers. Furthermore, cloud service providers can offer their customers higher performance without compromising security.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:
1. A system comprising:
a computer to communicatively connect to a cloud network, the computer comprising an operating system and a bare metal guest configuration in which the operating system is executable on the computer without an intervening hypervisor;
a control agent executable on a processor to govern communication between the computer and resources of the cloud network; and
a network interface controller to route packets to and from the computer in accordance with commands from the control agent, the commands instructing a module in the network interface controller, wherein the network interface controller comprises a plurality of registers, and the network interface controller is to apportion a first subset of the plurality of registers to be used by the operating system for network interface operations and a second subset of the plurality of registers to the control agent,
the control agent to use the second subset of the plurality of registers to govern the communication between the computer and resources of the cloud network, wherein a first register in the second subset of registers is implemented to associate rules with port numbers, a second register in the second subset of registers is implemented to control a rate limit and a third register in the second subset of registers is implemented to add records to packets.

2. The system of claim 1, wherein the module comprises an access control list module, a rate limit module, an encapsulation module, or a decapsulation module.

3. The system of claim 1, wherein the control agent is a module of the network interface controller.

4. The system of claim 1, wherein the control agent is a module of a remote management engine.

5. The system of claim 1, wherein the control agent is executable on the processor to send a command to an access control list module of the network interface controller, the command instructing the access control list module to control communication of data between a source and a destination according to a rule.

6. The system of claim 1, wherein the control agent is executable on the processor to send a command to a rate control module of the network interface controller, the command instructing the rate control module to control a rate of communication of data through the network interface controller.

7. The system of claim 1, wherein the control agent is executable on the processor to send a command to an encapsulation-decapsulation module of the network interface controller, the command instructing the encapsulation-decapsulation module to append a trailer or pre-pend a header to a data packet.

8. The system of claim 1, wherein the control agent is executable on the processor to, in response to migration of a bare metal guest from the computer to another computer:
   access the first subset of the plurality of registers apportioned to the operating system to obtain information of the operating system, and
   transfer the information of the operating system to a network interface controller of the another computer to which the bare metal guest is being migrated.

9. The system of claim 1, wherein the computer is without a hypervisor.

10. The system of claim 1, wherein the operating system is to use the first subset of the plurality of registers to perform packet transmission or reception.

11. A non-transitory computer readable medium storing instructions that upon execution cause at least one processor to:
   establish a connection between a computer and a cloud network, the computer comprising an operating system and a bare metal guest configuration in which the operating system is executable on the computer without an intervening hypervisor, wherein the computer is without a hypervisor;
   allocate a first group of network interface registers in a network interface controller to a control agent, the control agent being a module to use the first group of network interface registers to govern communication between the computer and resources of the cloud network;
   allocate a second group of the network interface registers in the network interface controller to be used by the operating system for network interface operations, wherein a first register in the second group of registers is implemented to associate rules with port numbers, a second register in the second group of registers is implemented to control a rate limit and a third register in the second group of registers is implemented to add records to packets; and
   handle packets of data to and from the computer in accordance with instructions by the control agent.

12. The non-transitory computer readable medium of claim 11, wherein the instructions upon execution cause the at least one processor to handle the packets of data using an access control list module, a rate limit module, an encapsulation module, or a decapsulation module.

13. The non-transitory computer readable medium of claim 11, wherein the control agent is a module of the network interface controller.

14. The non-transitory computer readable medium of claim 11, wherein the instructions upon execution cause the at least one processor to manage the bare metal guest configuration using a remote management engine.

15. The non-transitory computer readable medium of claim 14, wherein the control agent is a module of the remote management engine.

16. A method comprising
   establishing, using at least one processor, a connection between a computer and a cloud network, the computer comprising an operating system and a bare metal guest configuration in which the operating system is executable on the computer without an intervening hypervisor;
   apportioning, using at least one processor, a first subset of a plurality of network interface registers in a network interface controller to be used by the operating system for network interface operations, and a second subset of the plurality of network interface registers to a control agent;
   using, by the control agent, the second subset of the plurality of network interface registers to govern communication between the computer and resources of the cloud network, wherein a first register in the second subset of registers is implemented to associate rules with port numbers, a second register in the second subset of registers is implemented to control a rate limit and a third register in the second subset of registers is implemented to add records to packets; and
   routing, by the network interface controller, packets of data to and from the computer in accordance with instructions by the control agent.

17. The method of claim 16, wherein routing the packets comprises invoking an access control list module, a rate limit module, an encapsulation module, or a decapsulation module in accordance with the instructions by the control agent.

18. The method of claim 16, wherein the control agent is a module of the network interface controller.

19. The method of claim 16, wherein the bare metal guest configuration is managed by a remote management engine.

20. The method of claim 16, wherein the computer is without a hypervisor.

* * * * *